UNITED STATES PATENT OFFICE.

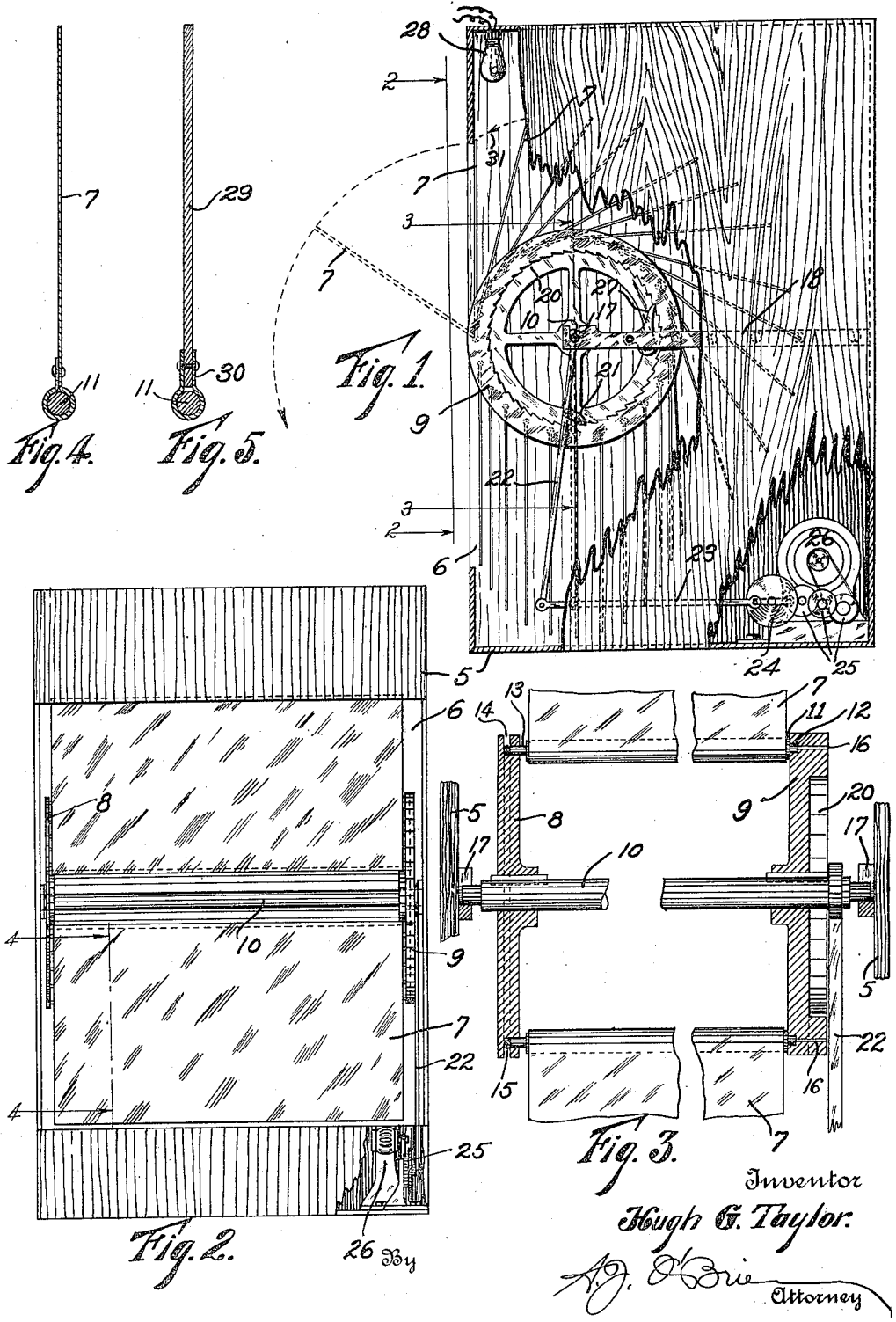

HUGH G. TAYLOR, OF GREELEY, COLORADO.

CHANGEABLE EXHIBITOR.

1,320,510. Specification of Letters Patent. Patented Nov. 4, 1919.

Application filed October 10, 1917. Serial No. 195,670.

*To all whom it may concern:*

Be it known that I, HUGH G. TAYLOR, a citizen of the United States, residing at Greeley, county of Weld, and State of Colorado, have invented certain new and useful Improvements in Changeable Exhibitors; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in changeable exhibitors of the hinged-leaf type, in which the leaves are mounted on a rotatable member, and has for an object the making of a simple, cheap construction whereby the leaves may be readily presented to view successively, and whereby they may be readily changed. A further object is the provision of means for illuminating the leaves when desired.

In the drawings forming a part of this specification

Figure 1 is a side elevation with part of the casing broken away to disclose the operative parts.

Fig. 2 is a front elevation as indicated by the arrows and line 2—2 of Fig. 1.

Fig. 3 is a fragmentary vertical section taken on the line 3—3 of Fig. 1, looking in the direction of the arrows, and shows in detail the construction and mounting of the rotary member and the leaves.

Fig. 4 shows one means for mounting the leaves on their supporting rods and is taken on line 4—4 of Fig. 2.

Fig. 5 shows another leaf mounting.

The mechanism is mounted in a casing 5 having a display opening 6. The back of the casing may have a door (not shown) for access to the interior.

The rotatable leaf-supporting member comprises two disks 8 and 9 splined on a shaft 10 and suitably spaced apart. A plurality of leaves 7 carrying advertising or other matter are mounted on wires or rods 11 having reduced ends 12, 13 fitting into apertures in the disks 8 and 9. The end 12 of each rod 11 is short and the adjacent shoulder of the rod fits flush against disk 9, while the end 13 is longer and the adjacent shoulder is out of contact with the disk 8. The aperture for end 13 extends through to a groove 14 in which a band, wire or cord 15 is placed. By removing the band or cord 15, the rod end 13 may be moved back into the groove 14 which is of sufficient width to equal the length of end 12 so that said end 12 will be freed from its aperture in disk 9, and the rod 11 and its leaf 7 may be removed and another inserted.

To facilitate removal of the rod, a small aperture 16 extends from the outer side of disk 9 to the aperture for end 12 and into this a small instrument may be inserted to push the end out.

When the rods have been inserted, the band or cord 15 is placed in groove 14, thus locking the rods against endwise movement.

The shaft 10 is journaled in bearings 17, in bars 18 mounted on the sides of the casing.

For imparting rotation, the disk 9 is countersunk and provided on the periphery of the countersunk portion with notches 20. A rock arm 22, having a pawl 21 thereon for engagement with notches 20, has its upper end pivotally connected with shaft 10 and is pivotally connected at its lower end with a stroke arm 23 which is reciprocated by a cam wheel 24 driven through the medium of a set of reducing gears 25 by a motor 26. A ratchet 27 is mounted on the bar 18 and engages notches 20 to prevent reverse rotation. A lamp or a series of lamps 28 is mounted in the upper front portion of the casing and may be used if desired in connection with transparent leaves so that the leaf in display position will be illuminated from behind.

In Fig. 4, the leaf is shown as being supported by wrapping one end around the rod 11 and securing it to the body of the leaf. In Fig. 5 the leaf 29 is separate and is secured to the rod 11 by a clip 30.

In operation the rotary member is advanced notch by notch by the arms 22, 23 and the pawl 21. As each sheet nears the upper portion of the view opening its center of gravity is suddenly shifted by a rotation of the rotary member of one notch and the sheet is thrown forward as indicated by arrow 31 with its upper edge in engagement with the casing at the upper edge of the display opening. The next movement of one notch frees the edge of the sheet and it falls down through the dotted line position to pendent position, another sheet coming into display position.

When the lamp is not used and the leaves are opaque, matter may appear on both sides of the leaves so that it may be exposed also in the pendent position. When transparent sheets are used, of course only one side may carry matter. Also both opaque and transparent sheets may be mounted on the rotating member, or each sheet may be partially transparent and partially opaque with matter suitably arranged thereon on one or both sides.

Having thus described my invention, what I claim is:

1. In a changeable exhibitor, a pair of spaced disks having perforations adjacent their peripheries, rods having their ends reduced, forming shoulders, said ends entering said perforations, one of said reduced ends on each rod being short, whereby the adjacent shoulder engages the respective disk, the other reduced end being longer and its shoulder being out of contact with the respective disk, there being a groove in the edge of the last mentioned disk, with the bottom of which groove the perforations for said longer ends communicate, and a member in said groove against which said longer ends abut to prevent longitudinal movement of said rods.

2. In a changeable exhibitor, a pair of spaced disks having perforations adjacent their peripheries, rods having their ends reduced, forming shoulders, said ends entering said perforations, one of said reduced ends on each rod being short, whereby the adjacent shoulder engages the respective disk, the other reduced end being longer and its shoulder being out of contact with the respective disk, there being a groove in the edge of the last mentioned disk, with the bottom of which groove the perforations for said longer ends communicate, and a member in said groove against which said longer ends abut to prevent longitudinal movement of said rods, said perforations for the short ends of said rods having small apertures communicating with the bottoms thereof to receive a rod-removing tool.

3. In a changeable exhibitor, a rotary member, a support therefor, means to rotate the member, said member comprising a shaft and two disks mounted on the shaft, said disks having perforations around the periphery of their inner faces, rods having their ends extending into the perforations, leaves carried by the rods, the ends of the rods being reduced, thereby forming shoulders on the rods, one reduced end of each rod being shorter than the other and the adjacent shoulder fitting flush against the face of its disk, the other reduced end being longer and its shoulder being out of contact with the face of its disk, the last named disk having a groove in its outer edge with the bottom of which the perforations communicate, and a band or cord in said groove against which the reduced ends abut, whereby the rods are held against endwise movement.

4. In a changeable exhibitor, a pair of spaced disks having perforations adjacent their peripheries, rods having their ends entering said perforations, means to retain one end of each rod in its perforation, there being a groove in the edge of the disk in which the other end of each rod is mounted, with the bottom of which groove the perforations for said other ends of said rods communicate, and means in said groove against which said other ends abut to prevent longitudinal movement of said rod.

5. In a changeable exhibitor, a pair of spaced disks having perforations adjacent their peripheries, rods having their ends entering said perforations, means to retain one end of each rod in its perforation, there being a groove in the edge of the disk in which the other end of each rod is mounted, with the bottom of which groove the perforations for said other ends of said rods communicate, and means in said groove against which said other ends abut to prevent longitudinal movement of said rod, the perforations for the first named ends of said rods having small apertures communicating therewith to receive a rod-removing tool.

6. In a changeable exhibitor, a pair of spaced disks having perforations adjacent their peripheries, rods having their ends entering said perforations, there being a groove in the edge of one disk, with the bottom of which groove certain of said perforations communicate, and means in said groove to engage the rod ends positioned in said certain perforations.

In testimony whereof I affix my signature.

HUGH G. TAYLOR.

Copies of this patent may be obtained for five cents each, by addressing the "Commissioner of Patents, Washington, D. C."